US012706969B2

(12) United States Patent
Patil et al.

(10) Patent No.: US 12,706,969 B2
(45) Date of Patent: Aug. 11, 2026

(54) CONTENT MANAGEMENT SYSTEMS PROVIDING ZERO RECOVERY TIME OBJECTIVE

(71) Applicant: T-Mobile USA, Inc., Bellevue, WA (US)

(72) Inventors: Vaishali Vijay Patil, Sammamish, WA (US); Seshama Naidu Enaganti, Johns Creek, GA (US); Ramkishan Sadasivam, Cumming, GA (US); Loganathan Kulanthaisamy, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 322 days.

(21) Appl. No.: 18/510,567

(22) Filed: Nov. 15, 2023

(65) Prior Publication Data

US 2024/0098140 A1 Mar. 21, 2024

Related U.S. Application Data

(63) Continuation of application No. 17/698,895, filed on Mar. 18, 2022, now Pat. No. 11,863,615.

(51) Int. Cl.
*H04L 67/1034* (2022.01)
*G06F 16/93* (2019.01)
(Continued)

(52) U.S. Cl.
CPC .......... *H04L 67/1017* (2013.01); *G06F 16/93* (2019.01); *H04L 67/1034* (2013.01); *H04L 67/1095* (2013.01)

(58) Field of Classification Search
CPC . H04L 51/04; H04L 65/1083; H04L 2209/56; G06Q 40/12; G06Q 20/047;
(Continued)

(56) References Cited

U.S. PATENT DOCUMENTS 5,896,506 A 4/1999 Ali et al.
5,897,643 A 4/1999 Matsumoto
(Continued)

FOREIGN PATENT DOCUMENTS

CN 104680079 A 6/2015
CN 104348838 B 8/2017
(Continued)

OTHER PUBLICATIONS

Microsoft SharePoint Server on AWS: Reference Architecture, Amazon Web Services website, Feb. 2012 [retrieved on Feb. 25, 2023]. Retrieved from the internet: <URL:https://awsmedia.s3.amazonaws.com/SharePoint_on_AWS_Reference_Architecture_White_Paper.pdf>.

*Primary Examiner* — Ryan J Jakovac
(74) *Attorney, Agent, or Firm* — Perkins Coie LLP

(57) ABSTRACT

A server system receives an electronic document from a client system to be stored at a content management system. The server system generates multiple copies of the electronic document that are stored in parallel at respective multiple instances of the content management system. The server system receives a request to retrieve a copy of the electronic document. In response to the request, the server system checks, by a load balancer, whether the respective multiple instances of the content management system are operational to retrieve the copy of the electronic document. The server system then performs load balancing by the load balancer in accordance with a round-robin process to select a particular instance and retrieves the copy of the electronic document from the particular instance of the content management system.

20 Claims, 5 Drawing Sheets

(51) Int. Cl.
*H04L 67/1017* (2022.01)
*H04L 67/1095* (2022.01)

(58) Field of Classification Search
CPC ........ G06Q 30/04; G06Q 20/20; G06Q 20/10; G06Q 30/06; G06Q 40/02; G06Q 20/04; G06Q 20/326; G06Q 20/108; G06Q 20/065; G06Q 30/0635; G06Q 30/0633; G06Q 20/401; G06Q 30/0601; G06Q 30/00; G06Q 10/0838; G06Q 20/0655; G06Q 30/016; G06F 11/2094; G06F 16/27; G06F 11/1469; G06F 11/1451
See application file for complete search history.

(56) References Cited

U.S. PATENT DOCUMENTS 6,424,966 B1 7/2002 Meyerzon et al.
6,493,731 B1 12/2002 Jones et al.
6,591,260 B1 7/2003 Schwarzhoff et al.
6,615,234 B1 9/2003 Adamske et al.
6,684,227 B2 1/2004 Duxbury
6,856,417 B2 2/2005 Hibma
6,983,416 B1 1/2006 Bae et al.
7,035,830 B1 4/2006 Shaikh
7,051,364 B1 5/2006 Tackman et al.
7,172,120 B2 2/2007 Schoenberg
7,197,547 B1 3/2007 Miller et al.
7,290,285 B2 10/2007 Mccurdy et al.
7,392,533 B2 6/2008 Ternasky et al.
7,418,656 B1 8/2008 Petersen
7,437,364 B1 10/2008 Fredricksen et al.
7,512,814 B2 3/2009 Chen et al.
7,587,398 B1 9/2009 Fredricksen et al.
7,853,564 B2 12/2010 Mierau et al.
7,853,572 B2 12/2010 Lundberg et al.
7,885,825 B2 2/2011 Climax et al.
8,195,613 B2 6/2012 Vukojevic
8,195,746 B2 6/2012 Heidloff et al.
8,452,791 B2 5/2013 Fortuna et al.
8,495,482 B2 7/2013 Cohen et al.
8,555,187 B2 10/2013 Margolin
8,832,047 B2 9/2014 Herbach et al.
9,280,529 B2 3/2016 Lemonik et al.
9,483,473 B2 11/2016 Ansel et al.
9,639,513 B2 5/2017 Boyer et al.
9,697,203 B2 7/2017 Grossman et al.
9,767,195 B2 9/2017 Strober
9,871,712 B1 1/2018 Sorenson et al.
9,934,106 B1 * 4/2018 Amarnath ........... G06F 11/1458
9,942,362 B2 4/2018 Zholudev et al.
10,121,071 B2 11/2018 Coleman et al.
10,146,873 B2 12/2018 Mullins
10,320,680 B1 * 6/2019 Mehr .................. H04L 67/1001
10,404,637 B2 9/2019 Masterson et al.
10,482,426 B2 11/2019 Valerio et al.
10,530,822 B2 1/2020 Lyons
10,542,088 B2 1/2020 Macksood et al.
11,003,630 B2 5/2021 Demaris et al.
11,095,576 B2 8/2021 Selinger
11,100,177 B2 8/2021 Jaroch
12,164,383 B2 * 12/2024 Rathi .................... G06F 16/188
2004/0261016 A1 12/2004 Glass et al.
2006/0168325 A1 7/2006 Wood et al.
2006/0271554 A1 11/2006 Shaikh
2007/0181736 A1 8/2007 Shaikh
2007/0226678 A1 9/2007 Li et al.
2007/0244906 A1 10/2007 Colton et al.
2008/0049258 A1 2/2008 Moyo et al.
2008/0148137 A1 6/2008 Terao et al.
2008/0239363 A1 10/2008 Ming
2011/0258182 A1 10/2011 Singh et al.
2012/0072392 A1 3/2012 Crowhurst et al.
2013/0031453 A1 1/2013 Griffiths et al.
2013/0031454 A1 1/2013 Griffiths et al.
2013/0031457 A1 1/2013 Griffiths et al.
2013/0166463 A1 6/2013 Samokhvalov
2014/0372369 A1 12/2014 Babanov et al.
2016/0210347 A1 * 7/2016 Meyer ..................... G06F 16/93
2017/0063936 A1 3/2017 Waas et al.
2018/0032997 A1 2/2018 Gordon et al.
2019/0065275 A1 2/2019 Wong et al.
2019/0141117 A1 5/2019 Ashner et al.
2019/0163922 A1 5/2019 Elangovan
2019/0266276 A1 8/2019 Patel et al.
2021/0034595 A1 2/2021 Tselikis et al.
2021/0255771 A1 * 8/2021 Kilaru ................... G06F 3/0659
2021/0397522 A1 12/2021 Owen et al.
2022/0166852 A1 * 5/2022 Lau ......................... H04L 67/56
2023/0236937 A1 * 7/2023 Vitali .................. G06F 11/1451
711/162

FOREIGN PATENT DOCUMENTS

CN 107368710 A 11/2017
CN 109284262 A 1/2019
CN 113574519 A 10/2021
CN 113704221 A 11/2021
CN 113840013 A 12/2021
DE 202020105259 U1 9/2020
EP 1357456 A2 10/2003
EP 1366403 A2 12/2003
EP 1685506 A2 8/2006
EP 1850241 A1 10/2007
EP 2060998 A1 5/2009
EP 2431891 A1 3/2012
EP 2965270 A2 1/2016
EP 3332405 A1 6/2018
JP 2001273279 A 10/2001
JP 2007304831 A 11/2007
JP 4153596 B2 9/2008
JP 4431300 B2 12/2009
JP 4876734 B2 12/2011
KR 20020003843 A 1/2002
KR 100653512 B1 12/2006
KR 100966323 B1 6/2010
WO 9827494 A1 6/1998
WO 2006106539 A1 10/2006
WO 2009122032 A2 10/2009
WO 2013016596 A2 1/2013
WO 2013142213 A1 9/2013
WO 2014004430 A1 1/2014
WO 2016181383 A2 11/2016
WO 2017059489 A1 4/2017
WO 2019143412 A1 7/2019

* cited by examiner

CONTENT MANAGEMENT SYSTEMS PROVIDING ZERO RECOVERY TIME OBJECTIVE

CROSS-REFERENCE TO RELATED APPLICATIONS

This application is a continuation of U.S. patent application Ser. No. 17/698,895, filed on Mar. 18, 2022, entitled CONTENT MANAGEMENT SYSTEMS PROVIDING ZERO RECOVERY TIME OBJECTIVE, which is hereby incorporated by reference in its entirety.

BACKGROUND

Content management systems include computer software used to manage the generation, modification, and storage of electronic content (e.g., electronic documents). Content management systems can support multiple users or client devices in a collaborative environment by integrating two or more server systems for document management and document retention and retrieval. As an example, content management systems can be used in the management of electronic legal content. Management of electronic legal content requires a higher level of operational stability due to the importance of such content.

Recovery time objective (RTO) refers to the amount of time a business has for restoring its software processes (e.g., content management processes) at an acceptable service level after a disruption to avoid intolerable consequences associated with the disruption. The disruption can include, for example, an instance where one or more servers or computer systems storing electronic content become non-operational. The RTO required for legal content management systems of businesses is relatively short so that any consequences to the operation of the business and/or clients can be avoided.

BRIEF DESCRIPTION OF THE DRAWINGS

Detailed descriptions of implementations of the present invention will be described and explained through the use of the accompanying drawings.

Figure 1:
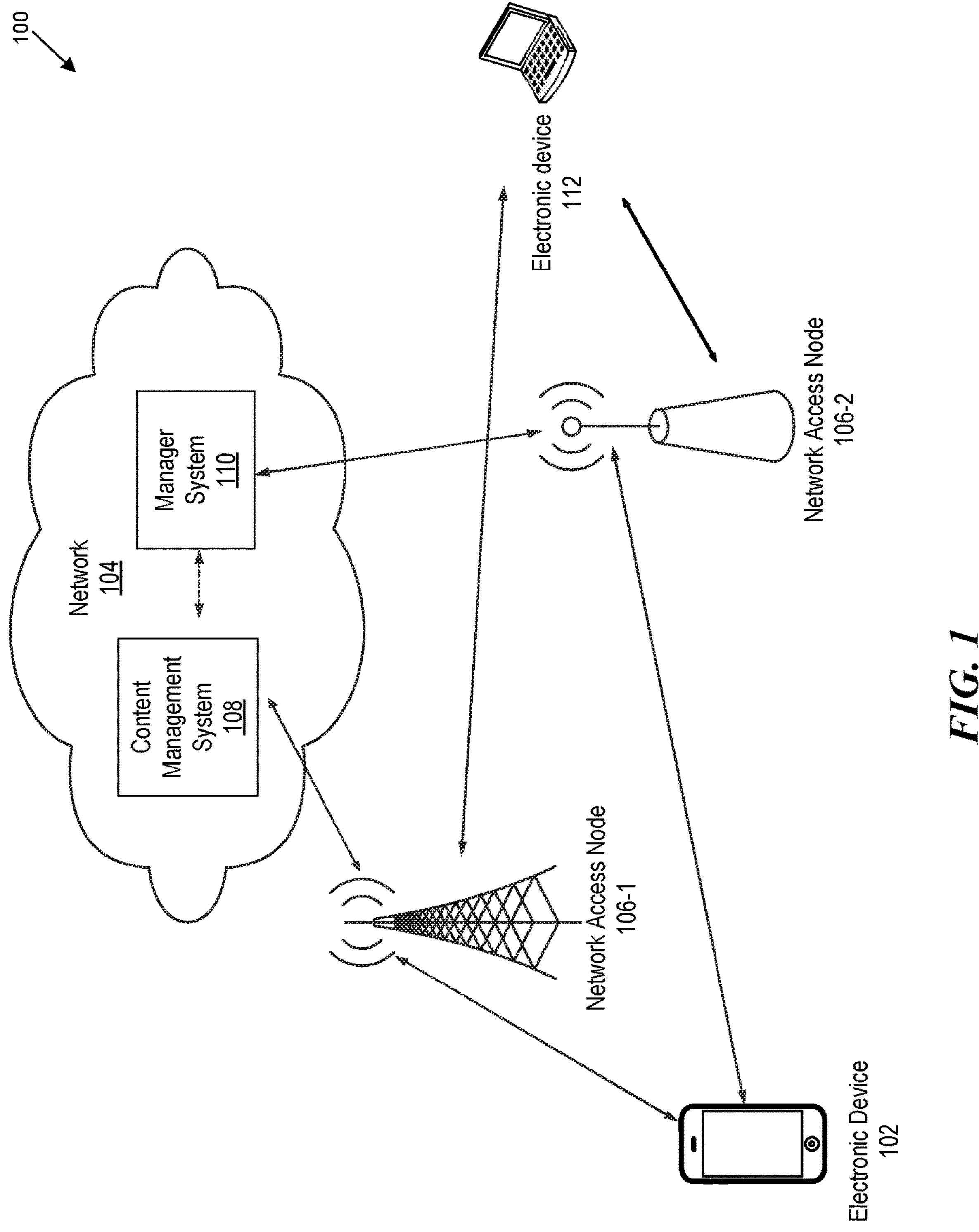
FIG. 1 is a block diagram that illustrates a network system.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology relates to content management systems having zero recovery time objective (RTO) for restoring software processes after operational disruptions. "Zero recovery" refers to a reduced or minimal recovery time (e.g., the RTO is zero or near zero). A system includes a server system in communication with a client application and a content management system. The server system can receive electronic content (e.g., an electronic document such as a purchase receipt) from the client application. The server system can then generate multiple copies of the electronic content and cause them to be stored in parallel at multiple instances of the content management system. The server system can then receive a request for a copy of the electronic content.

In one example, a user of the client application wants to retrieve a copy of a prior purchase receipt. In response to the request, the server system checks whether the respective multiple instances are operational to retrieve the copy of the electronic content. Based on the check, the server system performs a round-robin load balancing to select an operational instance of the multiple instances storing the copies of the electronic content. The server system then retrieves the copy of the electronic content from the selected operational instance and communicates the copy to the client application. Storing the multiple copies of the electronic content and performing the check on the operational status of the instances prior to retrieving the copy of the electronic content allows the system to retrieve the copy without delays even when one or more of the multiple instances have disrupted operations.

In another example, a server system associated with a wireless service provider for the management of content receives an electronic document at a data ingestion interface of the server system. The electronic document is communicated to the server system from a client application. The electronic document is to be stored at a content management system that is separate and distinct from the server system. The server system generates multiple copies of the electronic document and causes storing of the multiple copies of the electronic document in parallel at respective multiple instances of the content management system. The respective multiple instances of the content management system are distinct from each other. The server system receives a request to retrieve a copy of the electronic document stored at the content management system at a data retrieval interface of the server system. In response to the request to retrieve the copy of the electronic document, the server system checks, by a load balancer, whether the respective multiple instances of the content management system are operational to retrieve the copy of the electronic document. The server system then performs load balancing by the load balancer in accordance with a round-robin process to select a particular instance from among a group of the respective multiple instances of the content management system. The server system retrieves the copy of the electronic document from the particular instance of the content management system.

In another example, a method includes receiving electronic content at a first server system. The electronic content is to be stored at a second server system that is separate and distinct from the first server system. The method includes generating multiple copies of the electronic content by the first server system. The method also includes causing the second server system to store the multiple copies of the electronic content by the first server system. The multiple copies of the electronic content are stored in parallel at respective multiple instances. The method includes receiving, by the first server system, a request to retrieve a copy of the electronic content stored at the second server system. In response to the request to retrieve the copy of the electronic content, the method includes checking, by the first server system, whether the respective multiple instances of the second server system are operational to retrieve the copy of the electronic content. The method includes retrieving, by the first server system, the copy of the electronic content from a particular operational instance of the second server system selected from among a group of the respective multiple instances of the second server system. Retrieving the copy of the electronic content from the particular operational instance of the second server system is done in accordance with a balancing scheduler.

In yet another example, a client system is in communication with a server system associated with a wireless service provider for the management of electronic content. The client system sends an electronic document to a data ingestion interface of the server system. The electronic document is sent so that it can be stored. The server system generates multiple copies of the electronic document to be stored in parallel at respective multiple instances of a content management system. The content management system is separate and distinct from the server system. The client system sends, to the server system, a request to retrieve a copy of the electronic document. In response to the request to retrieve the copy of the electronic document, the client system causes the server system to check whether the respective multiple instances of the content management system are operational to retrieve the copy of the electronic document. The client system further causes the server system to select a particular instance from among a group of the respective multiple instances of the content management system in accordance with a balancing scheduler. The client device also causes the server system to retrieve the copy of the electronic document from the particular instance of the content management system. The client system subsequently receives the retrieved copy of the electronic document from the server system.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

System Overview

FIG. 1 is a block diagram that illustrates a network system 100. The system 100 includes an electronic device 102 that is communicatively coupled to network 104 via network access nodes 106-1 and 106-2 (referred to collectively as "network access nodes 106"). The system 100 also includes an electronic device 112 communicatively coupled to the network 104 via the network access nodes 106.

The electronic devices 102 and 112 are any type of electronic devices that can communicate with a network node and/or with another electronic device in a cellular, computer, and/or mobile communications system. Examples of such electronic devices include smartphones, tablet computers, laptop computers, wireless devices capable of machine-to-machine (M2M) communication, wearable electronic devices, movable Internet of Things devices (IoT devices), and any other handheld device that is capable of accessing the network(s) 104. Although only two electronic devices are illustrated in FIG. 1, the disclosed embodiments can include any number of electronic devices.

The electronic devices 102 and 112 can store and transmit (e.g., internally and/or with other electronic devices over a network) signals, code (composed of software instructions), or data by using machine-readable media, such as non-transitory machine-readable media (e.g., machine-readable storage media such as magnetic disks, optical disks, read-only memory (ROM), flash memory devices, and phase change memory) and transitory machine-readable transmission media (e.g., electrical, optical, acoustical, or other forms of propagated signals, such as carrier waves or infrared signals).

The electronic devices 102 and 112 can include hardware such as one or more processors coupled to sensors and a non-transitory machine-readable media to store code and/or sensor data, user input/output (I/O) devices (e.g., a keyboard, a touchscreen, and/or a display), and network connections (e.g., an antenna) to transmit code and/or data using propagating signals. The coupling of the processor(s) and other components is typically through one or more busses and bridges (also referred to as bus controllers). Thus, a non-transitory machine-readable medium of a given electronic device typically stores instructions for execution on a processor(s) of that electronic device. One or more parts of an implementation of the present technology can be implemented using different combinations of software, firmware, and/or hardware.

The network access nodes 106 can be any type of network access node that can communicate with a wired or wireless device (e.g., electronic devices 102 and 112) and/or with another network node. The network access nodes 106 can be a network device or apparatus. Examples of network access nodes include a base station (e.g., network access node 106-1), an access point (e.g., network access node 106-2), or any other type of network node such as a network controller, radio network controller (RNC), base station controller (BSC), a relay, transmission points, and the like.

The system 100 depicts different types of wireless access nodes 106 to illustrate that the electronic device 102 can access different types of networks through different types of network access nodes. For example, a base station (e.g., the network access node 106-1) can provide access to a cellular telecommunications system of the network(s) 104. An access point (e.g., the network access node 106-2) is a transceiver that provides access to a computer system of the network(s) 104.

The network(s) 104 can include any combination of private, public, wired, or wireless systems such as a cellular network, a computer network, the Internet, and the like. Any data communicated over the network(s) 104 can be encrypted or unencrypted at various locations or along different portions of the networks. Examples of wireless systems include Wideband Code Division Multiple Access (WCDMA), High Speed Packet Access (HSPA), Wi-Fi, Wireless Local Area Network (WLAN), and Global System for Mobile Communications (GSM), GSM Enhanced Data Rates for Global Evolution (EDGE) Radio Access Network (GERAN), 4G or 5G wireless wide area networks (WWAN), and other systems that can also benefit from exploiting the scope of this disclosure.

The system 100 further includes a manager server 110 and a content management system 108. The manager server 110 can mediate a flow of data from the electronic devices 102 and 112 to the content management system 108. In some implementations, the manager server 110 can include any number of server computers communicatively coupled to the electronic devices 102 and 112 via the network access nodes 106. The manager server 110 can include combinations of hardware and/or software to process data, perform functions, communicate over the network(s) 104, etc. For example, server computers of the manager server 110 can include a processor, memory or storage, a transceiver, a display, operating system and application software, and the like. Other components, hardware, and/or software included in the system 100 that are well known to persons skilled in the art are not shown or discussed herein for brevity. Moreover, although shown as being included in the network(s) 104, the manager server 110 can be located anywhere in the system 100 to implement the disclosed technology.

The content management system 108 can store data generated by the electronic device 102 and/or electronic device 112 and communicated to the content management system 108 via the manager server 110. The content management system 108 is distributed over a combination of network nodes that store data across other network nodes of a peer-to-peer network. The network nodes of the content management system 108 can each store an identical copy of the data and be updated independently. Although shown in the network(s) 104, content management system 108 can be located anywhere in the network system 100.

In some implementations, the manager server 110 can receive electronic content from the electronic device 102 and/or the electronic device 112 to be stored at the content management system 108. The manager server 110 causes the electronic content to be stored at the content management system 108. The manager server 110 can also receive requests from the electronic device 102 and/or the electronic device 112 to retrieve copies of the electronic content stored at the content management system 108.

In one implementation, the manager server 110 is associated with an electronic store providing products or services to be purchased online or at physical stores. For example, a user of the electronic device 102 can do an online purchase via the electronic device 102 for an item sold by the store. A receipt of the online purchase can be communicated from the electronic device 102 to the manager server 110 to be stored. The manager server 110 can further communicate the receipt of the online purchase to be stored at the content management system 108. After a period of time, the user of the electronic device 102 can have a need to retrieve a copy of the receipt. In one example, the user of the electronic device 102 wants to retrieve the copy of the receipt because the receipt includes a promotional code that the user can apply for another purchase. The user can also wish to retrieve the copy for other purposes such as for requesting a return or replacement of the purchased product, for the user's personal records, or for any other purpose. The user can send a request to retrieve a copy of the receipt to the manager server 110 which then retrieves a copy of the receipt from the content management system 108. Alternatively, the request to retrieve the copy can be sent via another electronic device, such as electronic device 112. For example, the user might have walked into a physical store to make further purchases and requested a sales associate to retrieve the copy of the receipt including the promotional code from the manager server 110.

Figure 2:
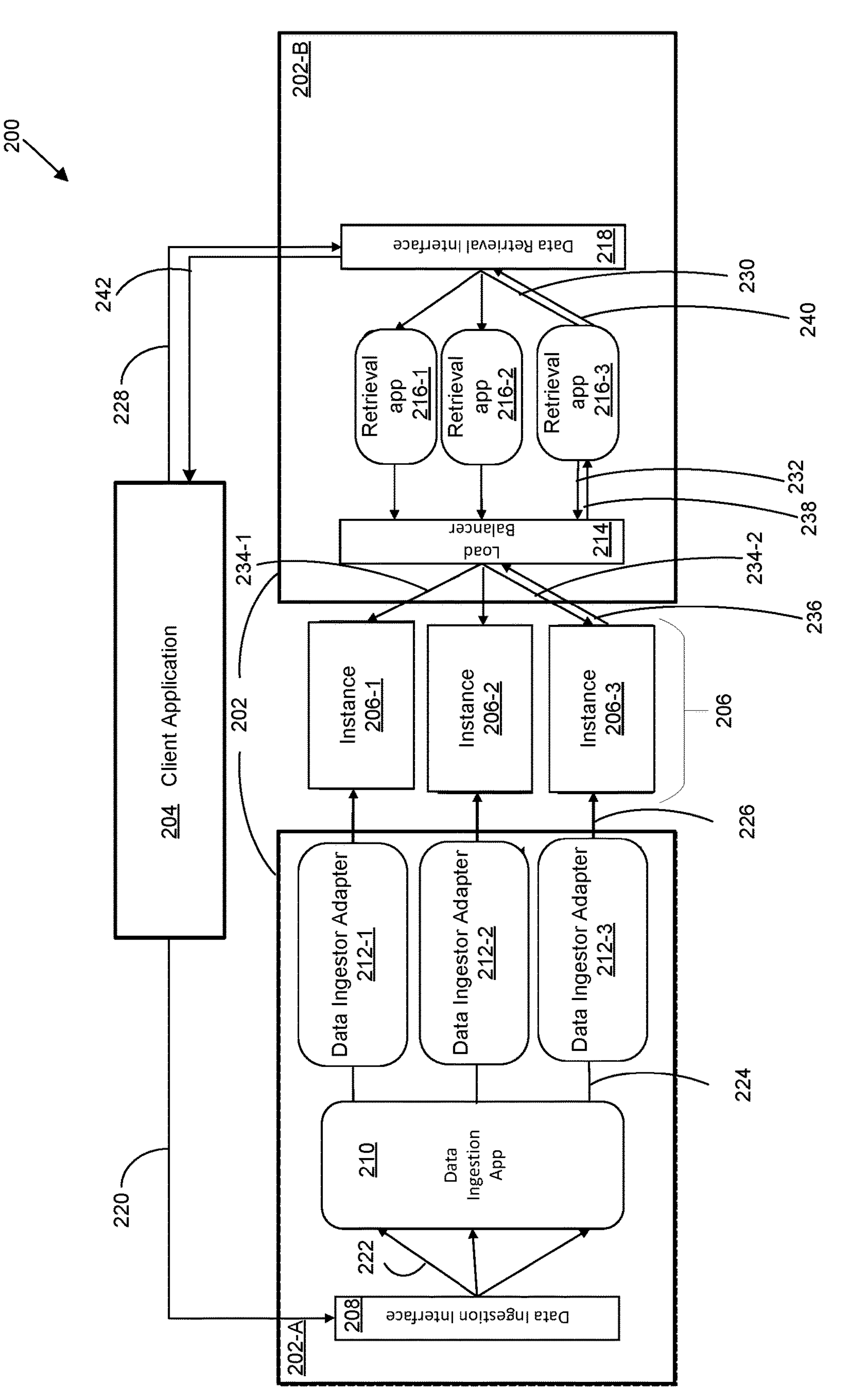
FIG. 2 is a block diagram that illustrates a system for managing electronic content.

FIG. 2 is a block diagram that illustrates a system 200 for managing electronic content. The system 200 includes a server system 202, a client application 204, and a content management system 206. The server system 200 is in wireless communication with the client application 204 and the content management system 206. The client application 204 can be distinct and separate from the server system 202 and the content management system 206. In some implementations, the content management system 206 is distinct and separate from the server system 202. In some implementations, the client application 204 is associated with an electronic device such as the electronic device 102 and 112. The content management system 206 can correspond to the content management system 108 and the server system 202 can correspond to the manager server 110 described with respect to FIG. 1.

In some implementations, the client application 204 is an application operating on the electronic devices 102 and 106. The client application 204 enables a user to generate electronic content and communicate the electronic content (e.g., at 220) to the server system 200 to be stored at the content management system 206. The client application 204 can be associated with the server system 202. For example, the server system 202 is a wireless network service provider and the client application 204 is an online store application (e.g., a web application or a mobile device application) that allows the user to purchase wireless services and/or products associated with wireless communications from the wireless network provider.

In some examples, the electronic content can include or correspond to an electronic document, an electronic record, an electronic data collection, an electronic communication (e.g., an email or an online discussion), or any other electronic content. The electronic content can include text, graphics, images, audio, and/or video content. In some implementations, the electronic content includes legal content. The electronic document can be a legal document such as a purchase receipt that is generated when the user purchases an item via the client application 204. As other examples, the electronic content includes a purchase agreement, a financing or a loan agreement, a contract agreement, a lease agreement, or any other legal document.

In some implementations, the server system 202 is a server system associated with a wireless service provider. The server system 202 can be configured to receive electronic content, such as electronic documents, from the client application and cause them to be stored at the content management server system 206. In some implementations, the server system 202 includes two or more servers or server units (e.g., server units that are portions of a single server or server system) that are in communication with the client application 204 as well as the content management system 206. As shown in FIG. 2, the server system 200 can include a data ingestor server 202-A or a data ingestor server unit that is configured to receive the electronic content from the client application 204, process the electronic content and transmit the electronic content to the content management system 206 for storing. The server system 200 also includes a data retrieval server 202-B or a retrieval server unit that is configured to receive requests to retrieve copies of the stored electronic content from the client application 204. The data retrieval server 202-B is further configured to retrieve copies of the requested electronic content from the content management system 206 and communicate the copies to the client application 204.

The content management system 206 is configured to store electronic content. The content management system

206 can include multiple instances, such as instances 206-1, 206-2, and 206-3. An instance refers to a single copy of software running on a single physical or virtual server. For example, an instance includes software capable of storing electronic content to servers. In some implementations, the content management system 206 includes multiple distinct and separate servers. Instances 206-1, 206-2, and 206-3 can each be associated with distinct servers or a respective server of the multiple distinct and separate servers includes two or more instances.

Arrows 220 through 232 illustrate communications or actions occurring within the server system 200. At 220, the client application 204 sends electronic content to the data ingestor server 202-A of the server system 202. As described, the electronic content can include an electronic document such as a purchase receipt for a smartphone. The electronic content is received by a data ingestion interface 208 of the data ingestion server 202-A. The data ingestion interface 208 is configured to allow communications between the server system 202 and the client applications 204 operating on multiple electronic devices (e.g., the electronic devices 102 and 112 described with respect to FIG. 1).

The communications can include receiving electronic content from the client application 204. The data ingestion interface 208 then processes the electronic content and transmits the processed content to one or more data ingestion applications (e.g., data ingestion application 210), at 222. The data ingestion application 210 facilitates the processes of storing the electronic content to electronic storage. In particular, the data ingestion application 210 generates multiple copies of the electronic content received from the data ingestion interface 208. The copies include content identical to the original electronic content received from the client application 204. The data ingestion application 210 can further process (or ingest) the copies of the electronic content to be applicable for storing by the content management system. The further processing can include changing a format of the multiple copies of the electronic content. In some implementations, changing the format includes changing a size of the multiple copies of the electronic content, or increasing or modifying searchability or retrievability characteristics of the multiple copies of the electronic content. In some implementations, the data ingestion application 210 processes the data in real-time or near real-time.

At 224, the data ingestion application 210 transmits the multiple copies of the electronic content to multiple data ingestor adapters (e.g., data ingestor adapters 212-1, 212-2, and 212-3 collectively referred to as "data ingestor adapters 212"). The data ingestor adapters 212-1, 212-2, and 212-3 are configured to operate as a bridge between the data ingestion application 210 and the content management system 206 by facilitating transmission of the electronic content received from the data ingestion application 210 to the multiple instances 206-1, 206-2, and 206-3 of the content management system 206. Each of the multiple data ingestor adapters 212 can receive a single copy of the electronic content. At 226, each of the multiple data ingestor adapters 212 feeds the single copy of the electronic content to a respective instance of instances 206-1, 206-2, and 206-3. For example, the data ingestor adapter 212-1 feeds a first copy of the electronic content to the instance 206-1, the data ingestor adapter 212-2 feeds a second copy of the electronic content to the instance 206-2, and the data ingestor adapter 212-3 feeds a third copy of the electronic content to the instance 206-3. The first, second, and third copies are identical copies of the same electronic content. The different instances 206-1, 206-2, and 206-3 are thereby configured to store identical copies of multiple electronic content received from the client application 204. Storing of the multiple identical copies enables retrieval of a copy of the electronic content from any of the instances 206-1, 206-2, and 206-3.

In an occurrence that a particular instance of the instances 206-1, 206-2, or 206-3 has an interrupted operation, a respective data ingestor adapter that has been fed the copies of the electronic content to that particular instance is notified. For example, the respective data ingestor adapter receives an error message indicating that the feeding has been unsuccessful. On such an occurrence, the respective data ingestor adapter places the copy of the electronic content in a queue. The respective data ingestor then continues attempts to feed the copy of the electronic content to the interrupted instance. When the interrupted instance is yet again operational, the feeding will be completed successfully and content from the queue, including the copy of the electronic content, will be fed to the instance.

For example, if the operation of the instance 206-1 is interrupted when the data ingestor adapter 212-1 is attempting to feed the copy of the electronic content to the instance 206-1, the copy of the electronic content is placed in a queue at the data ingestor adapter 212-1. The data ingestor adapter 212-1 then continues to attempt to feed the copy of the electronic document to the instance 206-1 for as long as the instance 206-1 is non-operational. When the operation of the instance 206-1 is restored, the copy of the electronic content is transmitted from the queue to the instance 206-1.

At 228, subsequent to storing the copies of the electronic content to the instances 206-1, 206-2, and 206-3 of the content management system 206, the server system 202 can receive a request to retrieve a copy of the electronic content from the client application 204. For example, the request is received one minute, 5 minutes, 30 minutes, an hour, a day, or several days after storing the electronic content. The client application 204 can run on the same or different electronic devices as when the client application was transmitting the electronic content for storing by the server system 202. For example, a first copy of the client application 204 is running on the electronic device 102 and a second copy of the client application 204 is running on the electronic device 112 described with respect to FIG. 1. The electronic devices having the client application 204 can be associated with the same user or different users.

As an example, the client application 204 is running on the electronic device 102 (e.g., a mobile phone) described with respect to FIG. 1. A user of the electronic device 102 makes an online purchase via the client application 204 that generates a receipt that is sent to the server system 202 to be stored. Subsequently, the user requests a copy of the receipt (e.g., for the purpose of using a promotional code included in the receipt) via the client application 204 running on the electronic device 102.

As another example, copies of the client application 204 are running on the electronic device 102 as well as on the electronic device 112 (e.g., a laptop) that are both associated with a same user. The user of the electronic device 102 makes the purchase that generates the receipt that is sent to the server system 202 to be stored. Subsequently, the user of the electronic device 102 requests the copy of the receipt via the client application 204 running on the electronic device 112. Alternatively, the electronic devices 102 and 112 can be associated with different users. In one example, the electronic device 102 is associated with a user of the mobile device while the electronic device 112 is associated with a store associated with the client application 204. The request to retrieve a copy of the electronic content can thereby be made by a salesperson assisting the user of the electronic device 102 at the store.

The request to retrieve the copy of the electronic content can be received by a data retrieval interface 218 of the server system 202. The data retrieval interface 218 is similar to the data ingestion interface 208 so that it is configured to allow communications with the client application 204 operating on multiple electronic devices (e.g., the electronic devices 102 and 112 described with respect to FIG. 1). The communications include, for example, receiving requests for retrieving data stored at the content management system and communicating retrieved data to the client application 204.

At 230, the data retrieval interface 218 transmits the request to one or more data retrieval applications (e.g., data retrieval applications 216-1, 216-2, and 216-3 collectively referred to as "data retrieval applications 216"). The data retrieval applications 216 are configured to process the requests to retrieve copies of electronic content stored at the content management system 206 as well as process the retrieved copies of the electronic content so that the retrieved copies can be transmitted to the client application 204.

At 232, the data retrieval applications 216 transmit the request to retrieve the copy of the electronic content to a load balancer 214 (e.g., a load balancer scheduler). In some implementations, the multiple data retrieval applications 216 send respective requests to retrieve the electronic content. For example, the data retrieval application 216-1 transmits a first request to retrieve a copy of the electronic content stored at the instance 206-1, the data retrieval application 216-2 transmits a second request to retrieve a copy of the electronic content stored at the instance 206-2, and the data retrieval application 216-3 transmits a third request to retrieve a copy of the electronic content stored at the instance 206-3. Having multiple data retrieval applications 216 can create redundancy at the application level and provide flexibility to maintain multiple versions of the application (e.g., client specific logic or translations can be embodied in to the data retrieval applications). In some implementations, a single data retrieval application 216 transmits a single request to receive a copy of the electronic content stored at any of the instances 206-1, 206-2, or 206-3 to the load balancer 214.

The load balancer 214 receives the request to retrieve the copy of the electronic content stored at the content management system 206. A load balancer refers to a component of a server system that acts as a reverse proxy to distribute network traffic across multiple servers or server units based on various scheduling processes (e.g., processes based on algorithms). The load balancer 214 is configured to steer or route the network traffic to server units that are available (e.g., are operating and are not overloaded) to prevent any single server unit from getting overloaded. In some implementations, the balancing processes include scheduling of network traffic based on round-robin load balancing processes. The round-robin load balancing includes routing requests for data retrieval to available servers in a cyclical manner. The load balancer 214 can be scheduled to send a first request to retrieve stored content to the instance 206-1, a second request to retrieve stored content to the instance 206-2, a third request to retrieve stored content to the instance 206-3, a fourth request to retrieve stored content to the instance 206-1, a fifth request to retrieve stored content to the instance 206-2, etc. In alternative implementations, the balance scheduling performed by the load balancer 214 includes other types of load balancing processes such as Fixed Weighting balancing, Resource-based balancing, Least Connection balancing, Weighted Response Time balancing, any other load balancing known in the art, or a combination thereof.

As described previously, the instances 206-1, 206-2, and 206-3 of the content management system 206 store identical copies of the electronic content that is requested to be retrieved by the client application 204. The load balancer 214 can therefore retrieve the copy of the electronic content from any of the instances 206-1, 206-2, and 206-3. When all of the instances are operational and thereby available for retrieval of the copy of the electronic document, the load balancer 214 can retrieve the copy of the electronic content from any of the instances in accordance with the balancing process. For example, the load balancer 214 selects a particular instance of the instances 206-1, 206-2, and 206-3 based on the round-robin load balancing process.

In order to mitigate failures or delays in retrieving the copy of the electronic content, however, the load balancer 214 ensures that the selected instance is indeed operational by monitoring the operational statuses of the instances 206-1, 206-2, and 206-3. The monitoring includes pinging the instances prior to requesting the retrieval of the copy of the electronic content. Pinging by the load balancer 214 refers to sending a ping command by the load balancer 214 to the selected instance of the instances 206-1, 206-2, and 206-3. The ping command is for inquiring server availability for retrieval of stored content.

For example, the load balancer 214 sends a short message or a data packet to a particular instance which then sends the short message or data packet back to the load balancer 214. If the short message or data packet is returned back to the load balancer 214, the load balancer 214 determines that the particular instance is operating and available for retrieving the copy of the electronic content. If the short message or data packet is not returned to the load balancer 214, the load balancer 214 determines that the particular instance is not operating and is not available for retrieving the copy of the electronic content. In accordance with the determination that the particular instance of the instances 206-1, 206-2, and 206-3 is operational, the load balancer 214 sends the request to retrieve the copy of the electronic content from the particular instance. In accordance with the determination that the selected instance of the instances 206-1, 206-2, and 206-3 is not operational, the load balancer 214 does not send the request to retrieve the copy of the electronic content to the particular instance.

In some implementations, the load balancer 214 can perform the pinging constantly (e.g., at a preset frequency) to monitor the operational status of all of the instances 206-1, 206-2, and 206-3 continuously or periodically. In one example, the load balancer 214 pings each of the instances 206-1, 206-2, and 206-3 concurrently or sequentially with a preset frequency. For example, the load balancer 214 can perform the pinging every 1 to 20 seconds (e.g., every 5 seconds).

As an example, at 234-1 the load balancer 214 pings the instances 206-1, 206-2, and 206-3 by sending a short message to the instances 206-1, 206-2, and 206-3. The load balancer 214 does not receive the short message back from the instance 206-1 and receives the short message back from the instances 206-2 and 260-3. The load balancer 214, therefore, determines that the instance 206-1 is not operational and the instances 206-2 and 206-3 are operational. The load balancer 214 then selects an instance from among the operational instances 206-2 and 206-3 for sending the request to retrieve the copy of the electronic content. The selection can be done based on a round-robin balancing process. In FIG. 2, the load balancer 214 has selected the instance 206-3 and therefore sends the request to retrieve the copy of the electronic content to the instance 206-3 at 234-2. At 236, the instance 206-3 transmits the copy of the electronic content to the load balancer 214 in response to the request.

Alternatively, the load balancer 214 can perform the pinging in accordance with the round-robin balancing process or some other balancing processes. In one example, the load balancer 214 performs scheduling in accordance with the round-robin balancing process to select a particular instance of the instances 206-1, 206-2, and 206-3. After the selection and before sending the request to retrieve the copy of the electronic content, the load balancer 214 pings the selected instance to ensure that the selected instance is operating.

At 238, the load balancer 214 further transmits the copy of the electronic content to the data retrieval application 216-3 that processes the copy of the electronic content. The processing can include changing a format or changing a size of the copy of the electronic content so that the copy of the electronic content is applicable to be transmitted to the client application 204. At 240, the data retrieval application 216-3 then transmits the copy of the electronic content to the data retrieval interface 218 which communicates the copy to the client application 204 at 242.

In some implementations, a time difference between receiving the request and retrieving the copy of the electronic content at 228 from the client application and communicating the copy of the electronic content to the client application 204 at 242 is within a pre-defined time threshold. For example, the pre-defined time threshold can be defined by a service provider associated with the system 200. The pre-defined time threshold is sufficiently short to ensure an efficient and pleasant customer experience for the user of the client application. For example, a maximum threshold time between receiving the request and retrieving the copy of the electronic content is 250 milliseconds, 500 milliseconds, or one second.

As described earlier, the server system 202 is configured to store electronic content received from the client application 204 as multiple copies in parallel at multiple instances of the content management system 206. The instances are distinct and separate from each other. The server system 202 is further configured to retrieve a copy of the electronic content upon request. Storing the multiple copies to the multiple distinct instances enables retrieval of the copy of the electronic content from any of the instances. In particular, the load balancer 214 of the server system is configured to monitor the operational status of the different instances and select a particular instance for retrieval of the copy of the electronic document based on the operational status. This allows the server system to always retrieve the requested copy of the electronic document without delays caused by interruptions in the operations of the instances.

Figure 3:
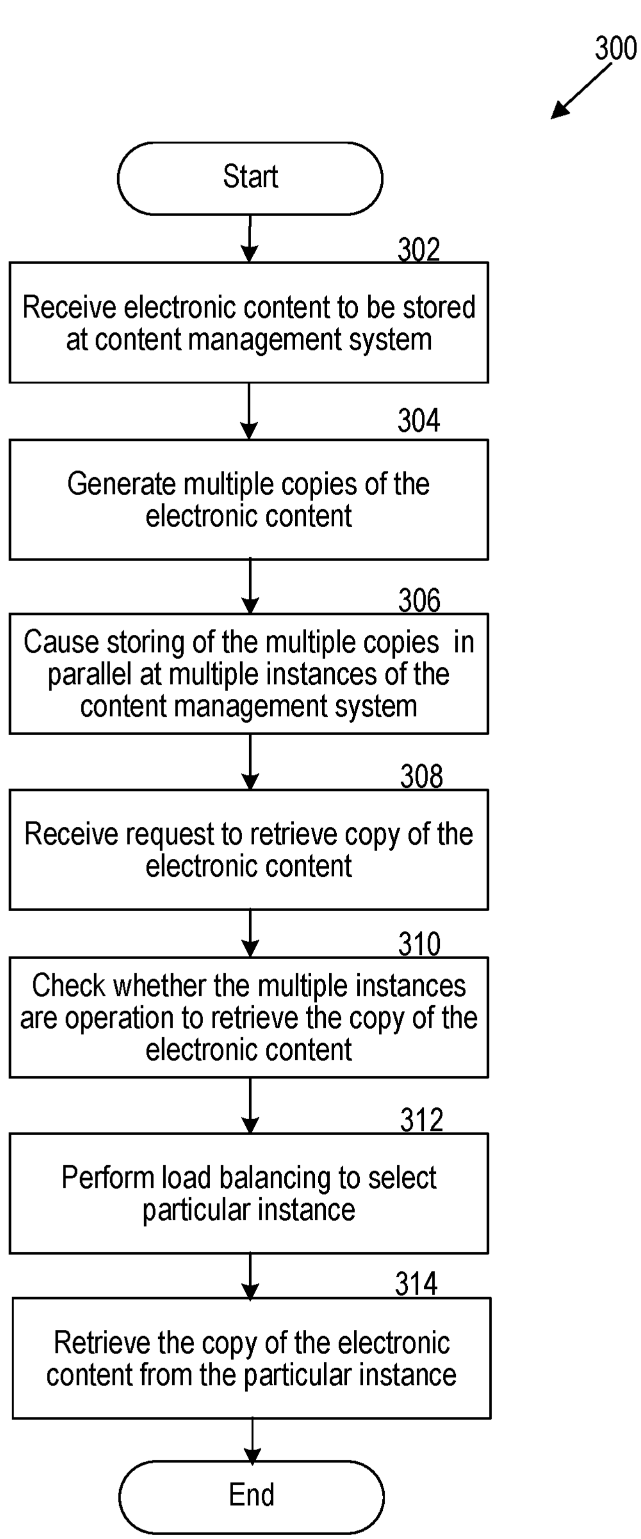
FIG. 3 is a flowchart that illustrates processes for management of electronic content.

FIG. 3 is a flowchart that illustrates processes 300 for management of electronic content. The processes 300 can be performed at a server system (e.g., the server system 202 in FIG. 2). The server system can be associated with a wireless service provider. The server system can include at least one hardware processor and at least one non-transitory memory storing instructions. In one example, the server system corresponds to a computer system 500 described with respect to FIG. 5. When the instructions are executed by the at least one hardware processor, the server system performs the processes 300.

The electronic content can correspond to an electronic document, an electronic record, an electronic data collection, an electronic communication (e.g., an email, a transcription of a voicemail, or an online discussion), or any other electronic content. The electronic content can include text, graphics, images, audio, and/or video content. In some implementations, the electronic content includes legal content. In one example, the electronic content includes a purchase receipt generated by the client application at a time of purchase. As another example, the electronic content includes a purchase agreement, a financing or loan agreement, a contract agreement, a lease agreement, or any other legal document.

At 302, the server system receives electronic content to be stored at a content management system (e.g., the content management system 206 in FIG. 2). In some implementations, the content management system is separate and distinct from the server system. The content management system can include one or more content management servers that each include one or more instances for storing electronic content. Distribution of the electronic content over multiple server systems and/or instances can increase the volume and reliability of storing the electronic content.

In some implementations, the electronic content is communicated to the server system from a client application (e.g., the client application 204). The client application can be a mobile device application or a web application running on a mobile device such as a mobile phone, a laptop computer, or a tablet computer (e.g., the electronic device 102 or 112) that is in wireless communication with the server system. The electronic content can be generated by the client application. For example, the client application can correspond to an online store application associated with the server system. The client application generates a purchase receipt as a user of the client application purchases an item via the client application.

In some implementations, the electronic content is received at a data ingestion interface (e.g., data ingestion interface 208 in FIG. 2) of the server system. The data ingestion interface is configured to facilitate communications between the client application and the server system. In some implementations, the data ingestion interface transmits the electronic content to a data ingestion application (e.g., data ingestion application 210).

At 304, the server system generates multiple copies of the electronic content. In particular, the data ingestion application of the server system can receive the electronic content from the data ingestion interface and generate the multiple copies of the electronic content. The data ingestion application can further process the electronic content and/or the multiple copies of the electronic content. In one example, the data ingestion application changes a format or a size of the generated multiple copies of the electronic content to be applicable for storing by the respective multiple instances.

At 306, the server system causes storing of the multiple copies of the electronic content in parallel at respective multiple instances of the content management system. The respective multiple instances of the content management system are distinct and separate from each other thereby operating independently from each other. The respective multiple instances can be configured to store identical copies of multiple electronic contents including the electronic content received from the client application 204. Causing storing of the multiple copies of the electronic content in parallel at the respective multiple instances is performed, for example, by the data ingestion application that transmits the multiple copies of the electronic content to respective multiple instances (e.g., the instances 206-1, 206-2, and 206-3 of the content management system 206 in FIG. 2) via multiple data ingestor adapters (e.g., the data ingestor adapters 212 in FIG. 2). The multiple data ingestor adapters are configured to feed the multiple copies of the electronic content to the respective multiple instances of the content management system.

In some implementations, in an occurrence that a first instance of the respective multiple instances is not operating when the multiple copies of the electronic content are fed to the respective multiple instances, a respective data ingestor adapter of the multiple data ingestor adapters, places a respective copy of the multiple copies of the electronic content to a queue of contents to be fed to the first instance. The respective data ingestor adapter then feeds the respective copy of the multiple copies of the electronic content from the queue of contents to the first instance when the first instance is operational.

At 308, the server system receives a request to retrieve a copy of the electronic content stored at the content management system. The request to retrieve the copy of the electronic content can be received from the client application (e.g., the client application 204 in FIG. 2). The request can be received at a data retrieval interface (e.g., data retrieval interface 218 in FIG. 2) which is configured to facilitate communications associated with data retrieval between the server system and the client application.

In response to the request to retrieve the copy of the electronic content, at 310 the server system checks whether the respective multiple instances of the content management system are operational to retrieve the copy of the electronic content. The check can be performed by a load balancer (e.g., the load balancer 214 in FIG. 2) of the server system. In some implementations, checking whether the respective multiple instances of the content management system are operational includes pinging a respective instance of the respective multiple instances to check whether the respective instance of the multiple instances is operational. The pinging can be performed with the load balancer 214 prior to performing load balancing for retrieving the copy of the electronic content. For example, the checking can include pinging each of the multiple instances to determine whether instances are operational. The checking of different instances can be done concurrently or sequentially. The checking can be done by pinging the multiple instances at a pre-defined frequency or by a round-robin or other scheduling processes.

At 312, the load balancer of the server system performs load balancing in accordance with a round-robin process. The load balancing is for selecting a particular instance from among a group of the respective multiple instances of the content management system. The group of the respective multiple instances precludes non-operational instances and thereby includes only those instances that the load balancer has determined to be operational based on the operation status check performed at 310. In some implementations, retrieving the copy of the electronic content from a particular operational instance of the content management system selected from among the group of the respective multiple instances is performed in accordance with a balancing scheduler (e.g., the round-robin process or some other load balancing process).

For example, if the load balancer determines that a particular instance of the multiple instances is not operational after performing the checking, the load balancer does not attempt to retrieve the copy of the electronic content from that particular non-operational instance. Instead, the load balancer will retrieve the copy of the electronic content from an operational instance. When multiple instances are checked to be operational, the load balancer selects the instance for retrieving the copy of the electronic content based on load scheduling.

At 314, the server system retrieves the copy of the electronic content from the particular instance of the content management system. The server system can then transmit the retrieved copy of the electronic content to the client application. By performing the processes 300, the server system can avoid delays in retrieving the stored copies of the electronic content due to data server failures at the content management system.

Figure 4:
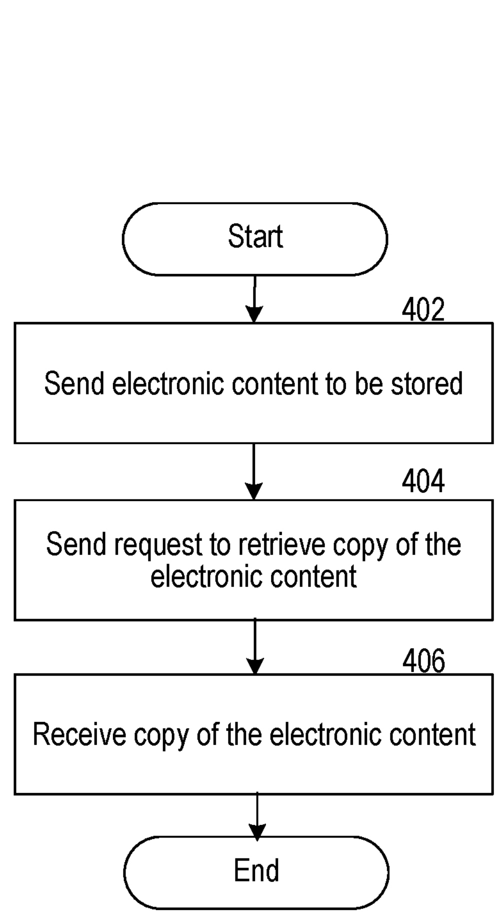
FIG. 4 is a flowchart that illustrates processes for sending electronic content to be stored at a content management system and requesting copies of the stored electronic content.

FIG. 4 is a flowchart that illustrates processes 400 for sending electronic content to be stored at a content management system (e.g., the content management system 206 in FIG. 2) and requesting copies of the stored electronic content. The processes 400 can be performed at a client system (e.g., the electronic device 102 or electronic device 112 in FIG. 1) in communication with a server system (e.g., the server system 202 in FIG. 2) associated with a wireless service provider for management of electronic content. The client system can include at least one hardware processor and at least one non-transitory memory storing instructions. For example, the client system corresponds to the computer system 500 described with respect to FIG. 5. When the instructions are executed by the at least one hardware processor, the client system performs the processes 400.

At 400, the client system sends (e.g., via the client application 204 in FIG. 2) an electronic content to be stored to a data ingestion interface (e.g., data ingestion interface 208) of the server system. The electronic content can correspond to an electronic document. In some implementations, the electronic content includes legal content such as a purchase receipt or finance agreement. For example, the electronic content corresponds to a purchase receipt generated by the client system at a time of a purchase. A copy of the electronic content corresponds to a copy of the purchase receipt retrieved subsequent to the time of purchase.

At 402, the server system generates multiple copies of the electronic content to be stored in parallel at respective multiple instances (e.g., the instances 206-1, 206-2, and 206-3 in FIG. 2) of the content management system. The content management system can be separate and distinct from the server system.

At 404, the client system sends to the server system a request to retrieve a copy of the electronic content. In response to the request to retrieve the copy of the electronic content, the client system causes the server system to check whether the respective multiple instances of the content management system are operational to retrieve the copy of the electronic content. The client system causes the server system to select a particular instance from among a group of the respective multiple instances of the content management system in accordance with a balancing scheduler (e.g., a round-robin process). The client system also causes the server system to retrieve the copy of the electronic content from the particular instance of the content management system.

At 406, the client system receives the copy of the electronic content from the server system. In some implementations, a time elapsed between sending the request to retrieve the copy of the electronic content and receiving the copy of the electronic content is less than or equal to a pre-defined time. The pre-defined time between requesting and receiving a copy of the electronic content can be defined, for example, by the service provider associated with the server system to ensure that there are no delays in the retrieval of the electronic content upon request.

Computer System

Figure 5:
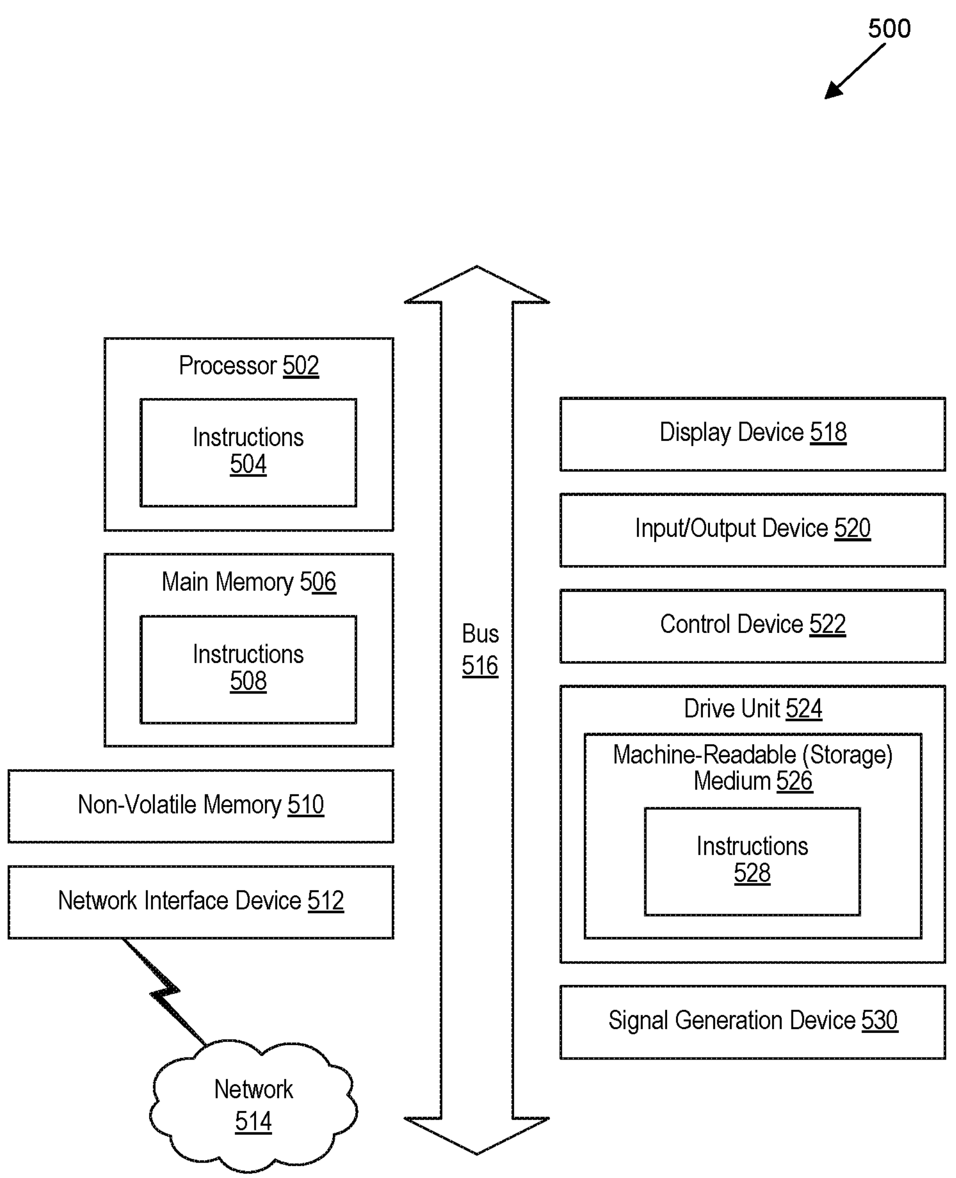
FIG. 5 is a block diagram that illustrates components of a computing device.

FIG. 5 is a block diagram that illustrates an example of a computer system 500 in which at least some operations described herein can be implemented. As shown, the computer system 500 can include: one or more processors 502, main memory 506, non-volatile memory 510, a network interface device 512, video display device 518, an input/output device 520, a control device 522 (e.g., keyboard and pointing device), a drive unit 524 that includes a storage medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computing system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some implementation, the computer system 500 can be an embedded computer system, a system-on-chip (SOC), a single-board computer system (SBC) or a distributed system such as a mesh of computer systems or include one or more cloud components in one or more networks. Where appropriate, one or more computer systems 500 can perform operations in real-time, near real-time, or in batch mode.

The network interface device 512 enables the computing system 500 to mediate data in a network 514 with an entity that is external to the computing system 500 through any communication protocol supported by the computing system 500 and the external entity. Examples of the network interface device 512 include a network adapter card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable (storage) medium 526 can include any medium that is capable of storing, encoding, or carrying a set of instructions for execution by the computing system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computing system 500 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A computer-implemented method for management of content, the method comprising:

receiving, at a server system, an electronic content for storing, generating, by the server system, multiple copies of the electronic content;

transmitting, by the server system, the multiple copies of the electronic content to a content management system to be stored by the content management system in parallel at respective multiple instances of the content management system, the transmitting comprising:

transmitting each of the multiple copies of the electronic content to a respective ingestor adapter of multiple ingestor adapters, and feeding, by each respective ingestor adapter of the multiple ingestor adapters, a respective copy of the multiple copies of the electronic content to an instance of the respective multiple instances;

in response to a notification that a first instance of the respective multiple instances is not operating when the multiple copies of the electronic content are transmitted to the respective multiple instances:

placing, by a first data ingestor adapter of multiple data ingestor adapters, a first copy of the multiple copies of the electronic content to a queue of contents to be fed to the first instance; and feeding, by the first data ingestor adapter, the first copy of the multiple copies of the electronic content from the queue of contents to the first instance when the first instance is operational;

receiving, by the server system, a request to retrieve a copy of the electronic content; and in response to the request to retrieve the copy of the electronic content, retrieving, by the server system, the copy of the electronic content from a particular operational instance of the content management system selected from among a group of the respective multiple instances.

2. The method of claim 1, wherein the particular operational instance of the server system selected from among the group of the respective multiple instances in accordance with a balancing scheduler.

3. The method of claim 1, further comprising:

in response to the request to retrieve the copy of the electronic content, pinging, with a load balancer, a respective instance of the respective multiple instances to check whether the respective instance of the multiple instances is operational.

4. The method of claim 1, wherein the group of the respective multiple instances precludes non-operational instances.

5. The method of claim 1, further comprising:

subsequent to generating the multiple copies of the electronic content;

changing a format of the multiple copies of the electronic content to be applicable for storing by the respective multiple instances.

6. The method of claim 1, wherein receiving the request to retrieve the copy of the electronic content stored at the content management system is received from a client application.

7. The method of claim 1, further comprising:

transmitting the retrieved copy of the electronic content to a client application.

8. The method of claim 1, wherein the electronic content corresponds to a purchase receipt generated by a client application at a time of purchase; and the copy of the electronic content corresponds to a copy of the purchase receipt retrieved subsequent to the time of purchase.

9. A server system for management of content, the server system comprising:

at least one hardware processor; and at least one non-transitory memory storing instructions, which, when executed by the at least one hardware processor, cause the server system to:

receive an electronic content for storing, generate multiple copies of the electronic content;

transmit of the multiple copies of the electronic content to a content management system to be stored in parallel at respective multiple instances of the content management system, the transmitting comprising:

transmitting each of the multiple copies of the electronic content to a respective ingestor adapter of multiple ingestor adapters, and feeding, by each respective ingestor adapter of the multiple ingestor adapters, a respective copy of the multiple copies of the electronic content to an instance of the respective multiple instances;

in response to a notification that a first instance of the respective multiple instances is not operating when the multiple copies of the electronic content are transmitted to the respective multiple instances:

place, by a first data ingestor adapter of multiple data ingestor adapters, a first copy of the multiple copies of the electronic content to a queue of contents to be fed to the first instance; and feed, by the first data ingestor adapter, the first copy of the multiple copies of the electronic content from the queue of contents to the first instance when the first instance is operational;

receive a request to retrieve a copy of the electronic content; and in response to the request to retrieve the copy of the electronic content, retrieve the copy of the electronic content from a particular operational instance of the content management system selected from among a group of the respective multiple instances.

10. The system of claim 9, wherein the particular operational instance of the server system selected from among the group of the respective multiple instances in accordance with a balancing scheduler.

11. The system of claim 9 wherein the system is further caused to:

in response to the request to retrieve the copy of the electronic content, pinging, with a load balancer, a respective instance of the respective multiple instances to check whether the respective instance of the multiple instances is operational.

12. The system of claim 9, wherein the group of the respective multiple instances precludes non-operational instances.

13. The system of claim 9, wherein the system is further caused to:

subsequent to generating the multiple copies of the electronic content;

changing a format of the multiple copies of the electronic content to be applicable for storing by the respective multiple instances.

14. The system of claim 9, wherein receiving the request to retrieve the copy of the electronic content stored at the content management system is received from a client application.

15. The system of claim 9, wherein the system is further caused to:

transmitting the retrieved copy of the electronic content to a client application.

16. The system of claim 9, wherein the electronic content corresponds to a purchase receipt generated by a client application at a time of purchase; and the copy of the electronic content corresponds to a copy of the purchase receipt retrieved subsequent to the time of purchase.

17. A client system in communication with a server system associated with a wireless service provider for management of electronic content, the client system comprising:

at least one hardware processor; and at least one non-transitory memory storing instructions, which, when executed by the at least one hardware processor, cause the client system to:

send, to a server system, an electronic content to be stored, wherein the server system generates multiple copies of the electronic content to be stored in parallel at respective multiple instances of a content management system, wherein the server system transmits each of the multiple copies of the electronic content to a respective ingestor adapter of multiple ingestor adapters, and wherein each respective ingestor adapter of the multiple ingestor adapters feeds a respective copy of the multiple copies of the electronic content to an instance of the respective multiple instances, wherein, in response to a notification that a first instance of the respective multiple instances of the content management system is not operating when the multiple copies of the electronic content are transmitted to the respective multiple instances, a first data ingestor adapter of multiple data ingestor adapters places a first copy of the multiple copies of the electronic content to a queue of contents to be fed to the first instance; and the first data ingestor adapter feeds the first copy of the multiple copies of the electronic content from the queue of contents to the first instance when the first instance is operational;

send, to the server system, a request to retrieve a copy of the electronic content, wherein, in response to the request to retrieve the copy of the electronic content:

cause the server system to retrieve the copy of the electronic content from a particular operational instance of the content management system selected from among a group of the respective multiple instances; and receive the copy of the electronic content from the server system.

18. The client system of claim 17, wherein the particular operational instance of the server system selected from among the group of the respective multiple instances in accordance with a balancing scheduler.

19. The client system of claim 17, wherein a time elapsed between sending the request to retrieve the copy of the electronic content and receiving the copy of the electronic content is less than or equal to a pre-defined time.

20. The client system of claim 17, wherein:

the electronic content corresponds to a purchase receipt generated by the client system at a time of a purchase; and the copy of the electronic content corresponds to a copy of the purchase receipt retrieved subsequent to the time of purchase.

* * * * *